United States Patent

Muto et al.

[15] 3,648,993
[45] Mar. 14, 1972

[54] WORK PIECE PRESSING DEVICE IN AUTOMATIC STACK GAS CUTTING

[72] Inventors: Masataro Muto; Masaaki Yagasaki, both of Nagasaki City, Japan

[73] Assignee: Mitsubishi Jukogyo Kabushiki Kaisha, Tokyo, Japan

[22] Filed: June 30, 1970

[21] Appl. No.: 51,307

[52] U.S. Cl. .............................................. 266/23 K, 148/9
[51] Int. Cl. ........................................................ B23k 7/02
[58] Field of Search ........................... 266/23 K, 23 M; 148/9

[56] References Cited

UNITED STATES PATENTS

| | | | |
|---|---|---|---|
| 2,474,153 | 6/1949 | Livesay | 266/23 K |
| 3,119,724 | 1/1964 | Campbell | 148/9 |
| 3,338,757 | 8/1967 | Dodge et al. | 266/23 K X |

*Primary Examiner*—Frank T. Yost
*Attorney*—McGlew and Toren

[57] ABSTRACT

A support for a cutting torch is mounted on rails extending along opposite sides of a support for a stack of metal plates to be cut, and a mounting member for the torch is displaceable longitudinally of the support so that the torch may be moved both longitudinally and laterally of the stack of metal sheets. A second pair of rails extend along opposite sides of the support for the stack, and receive rollers mounting a pair of mounting structures extending in spaced, parallel and interconnected relation across the stack of sheets on opposite sides of the torch. The supporting structures have hydraulic jacks extending downwardly therefrom at equally spaced intervals therealong, and each hydraulic jack has a roller at its free end engageable with the top sheet of the stack so that the sheets of the stack may be compressed. Feelers are provided before and behind each roller to detect cuts in the stacked sheets so that the pressing rollers, when arriving at a cut, may be released from the stack temporarily and then reengaged with the stack. The rail supporting the rollers for the supporting structures of the hydraulic jacks are designed to limit upward movement of these rollers to thus absorb the reaction forces when the hydraulic jacks press the pressing rollers against the stack.

6 Claims, 4 Drawing Figures

INVENTORS
MASATARO MUTO
MASAAKI YAGASAKI

WORK PIECE PRESSING DEVICE IN AUTOMATIC STACK GAS CUTTING

BACKGROUND OF THE PRIOR ART

This invention relates to a workpiece pressing device adapted for use in a cutting apparatus for cutting a plurality of stacked materials of same type at one time by use of a steel plate gas cutting method, particularly with a numerical control system.

Recently, in construction of the shell of a ship, particularly a large-sized ship for specific use, there is often seen a necessity of cutting out a plurality of members of the same type from a steel plate or plates. In order to meet such necessity, efforts are being made to work out a method and means for achieving effective stack-cutting by use of an automatic steel plate gas cutting process under a numerical control system, which if realized will greatly contribute to diminution in the number of man hours as well as to improvement of performance and reduction of cost in ship building.

The gas cutting apparatuses for steel plates using a numerical control system are known in the art and employed for practical uses, and such apparatuses have realized a remarkable diminution of the man hours required for laying out or for manual gas cutting operations. These known apparatuses, however, involve many defects and difficulties in actual operation. According to such conventional apparatus, the steel plates are cut one by one, and in case cutting is made on a plurality of stacked steel plates, a problem arises in pressing the work pieces together at the cutting section at any desired position on the upper surface of the stack where the burner, which is the most important element in stack-cutting, is moved to effect cutting. Particularly, at the central part of the stack of steel plates to be cut, it is almost impossible to obtain perfect surface contact under pressure between the plates, resulting in difficulty in achieving smooth and clear-cut finishing at the cut sections and to obtain desired correct patterns. However, in such gas cutting of a stack of workpieces under numerical control system, if good contact between the workpieces at the cutting section is obtained wherever the burner is positioned on the stack surface, it will be possible to attain perfect stack-cutting of steel plates.

SUMMARY OF THE INVENTION

The present invention is directed to providing a workpiece pressing device for use in a steel plate gas cutting apparatus employing a numerical control system, which provides always close contact between the workpieces at the section where the cutting is to be made, wherever the burner is moved on the surface of the stack. The present device comprises a pair of spaced roller supporting structures which extend parallel to a gas cutting apparatus supporting structure arranged such that its amount of movement is regulated by a numerical control mechanism, with a burner of the gas cutting apparatus being interposed between the roller supporting structures, and a plurality of rollers secured through hydraulic jacks to the respective roller supporting structures so that the rollers can move linearly in the same direction of movement of the supporting structures, wherein the rollers are pressed against the surface of the stack of workpieces to be cut and the roller supporting structures are moved linearly in accordance with movement of the burner.

Thus, according to the present invention, the stacked workpieces, upon which the burner of the gas cutting apparatus is positioned, are always placed under the constant pressing force of the rollers and are therefore closely pressed against each other without leaving room for any undesirable distortion, thus allowing the stack-cutting apparatus to operate with its full capacity so as to produce at one time a number of excellently finished articles having correctly contoured cut sections.

For an understanding of the invention, reference is made to the following description of a particular embodiment thereof as illustrated in the accompanying drawing.

DESCRIPTION OF THE PREFERRED EMBODIMENT

Figure 1:
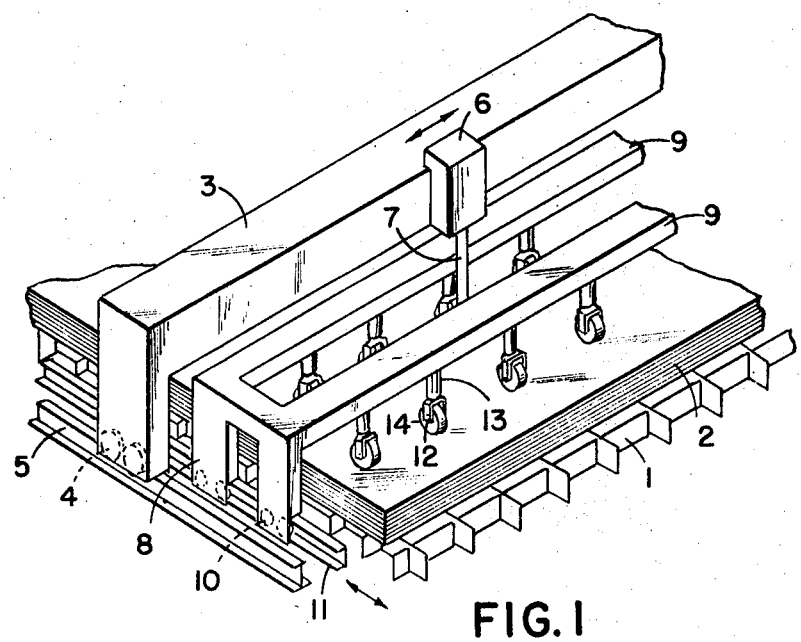
FIG. 1 is a partial perspective view illustrating a stack of several steel sheets or plates being cut by an automatic gas cutting apparatus, under numerical control, and utilizing the pressing device of the invention.
Figure 2:
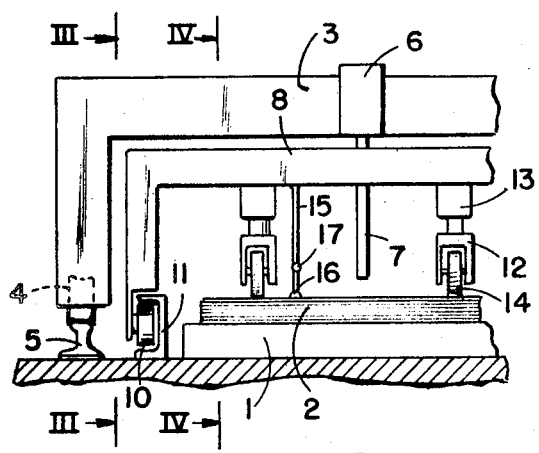
FIG. 2 is a partial front elevation view corresponding to FIG. 1.
Figure 3:
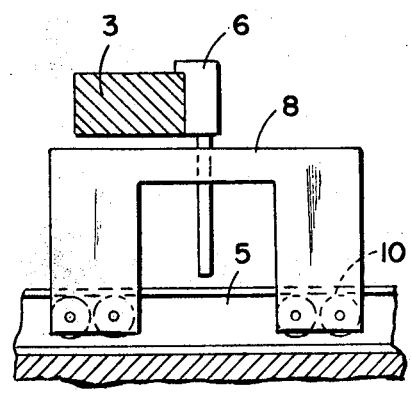
FIG. 3 is a sectional view taken on line III—III of FIG. 2, looking in the direction of the arrows.
Figure 4:
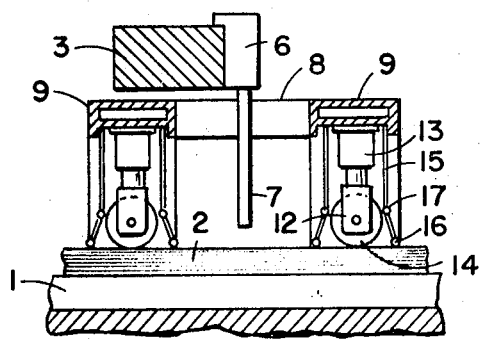
FIG. 4 is a sectional view taken on the line IV—IV of FIG. 2, looking in the direction of the arrows.

Referring to the drawings in general, reference number 1 designates a lattice-formed base block upon which a stack of workpieces 2 to be cut is carried, 3 a gas cutting apparatus supporting structure mounted astride of this base block 1, said structure having at its opposite ends the wheels 4, 4 which are carried on guide rails 5 laid along both side edges of base block 1 so as to allow movement of the structure in the longitudinal direction, indicated by arrow, of base block 1, and 6 a gas cutting apparatus supported on said supporting structure 3 and movable transversely of the base block 1, with a burner 7 being secured at the center of apparatus.

The above arrangement is one which is commonly employed in known gas cutting apparatuses. It will be understood that movement of the gas cutting apparatus supporting structure 3 relative to the base block 1 and movement of the gas cutting apparatus 6 on its supporting structure 3 are effected by means of motors (not shown) provided at suitable locations, respectively, and the amount of such movement is of course automatically regulated by a numerical control mechanism. Thus, the gas cutting apparatus 6 supporting the burner 7 can move in either of the two directions perpendicular to each other, that is, either lengthwise or breadthwise with respect to the stack of workpieces 2 on base block 1, so that the burner 7 can be moved to any position on stack 2.

Reference number 8 denotes a roller supporting structure comprising a pair of roller supporting frames 9, 9 which extend parallel to each other in the lengthwise direction of base block 1 and are spaced from each other at a constant interval (about 200 mm.) and which are mounted astride of base block 1 as shown. At both ends roller supporting structure 8 is provided with wheels 10, 10 riding on guide rails 11, 11 laid along both side edges of base block 1, so as to allow said structure 8 to move lengthwise of base block 1. It is to be noted that roller supporting structure 8 is interlocked, through suitable known gearing or like means, with gas cutting apparatus supporting structure 3 so that movement of the former always follows movement of the latter. Reference number 12 indicates a plurality of pressure-applying leg means secured through hydraulic jacks 13 to respective roller supporting frames 9, 9 with a constant interval therefrom. Each leg means carries at its bottom end a roller 14 adapted to roll along in the longitudinal direction of base block 1.

Reference number 15 denotes supporting rods which extend downward from said respective roller supporting frames 9, 9 correspondingly to the respective leg means 12 secured to frames 9, 9, and which pivotally carry, at their bottom ends, the roller feelers 16 which forerun (about 50 mm.) ahead of the respective rollers in their moving direction and sense the gas cutting finish line before the rollers 14 reach said line. Number 17 denotes pivots of roller feelers 16, the pivots been so adapted as to allow said feelers to sensitively move vertically, with the pivots as fulcrums as soon as feelers 16 cross the gas cutting line at any position on the stack of steel plates and, upon upward motion of roller feelers 16, a pulse signal is transmitted to a hydraulic jack operating mechanism (not shown) connected to the hydraulic jacks 13 of pressure-applying leg means 12 so as to supply oil pressure to jacks 13, whereby supply of oil pressure from this mechanism to the hydraulic jacks 13 is suspended to cause separation of leg means 12, and hence rollers 14, from the top surface of the stack of workpieces 2.

Having been described as to structure, the present invention will now be discussed from its operational aspect. In starting a gas cutting operation, oil pressure is first introduced into the hydraulic jacks 13 and the pressing legs 12 are forced down so that the rollers 14 are pressed against the top surface of the workpiece stack 2. The reaction force produced by pressing of the rollers 14 is received by guide rails 11, 11 through wheels 10, 10 on both ends of the roller supporting structure 8, whereby the workpieces 2, stacked in layers on the base block 1, are closely pressed against each other in a satisfactory manner. Under this condition, the gas cutting apparatus supporting structure 3 and the gas cutting apparatus 6 make either simultaneous or individual movements lengthwise or breadthwise with respect to the base block 1 under control of a numerical control mechanism, and the burner 7 secured to the gas cutting apparatus 6 is also moved accordingly to thereby perform automatic gas cutting.

During this operation, the roller supporting structure 8 moves on guide rails 11, 11 in the same direction and at same speed as the gas cutting apparatus supporting structure 3, through gearing or other means. Therefore, rolling movement of the rollers 14 at the bottom ends of the pressing legs 12 suspended from the respective roller supporting frames 9, 9 of the roller supporting structure 8 is in the same direction and at the same velocity as movement of the gas cutting apparatus supporting structure 3 and roller supporting structure 8 relative to the burner 7 and the rollers describe straight line loci parallel to those of structures 3 and 8.

In this manner, the desired cutting operation is carried out with the burner 7 which gradually changes its position on the stack of workpieces 2 in conformity to movement of the gas cutting apparatus supporting structure 3 and the gas cutting apparatus 6 under numerical control. It is to be noted that the stacked workpieces 2 to be cut are always placed under constant pressure of a plurality of rollers 14 which are provided along both sides of the burner 7 and which are always spaced at fixed intervals from the cutting point where cutting is made by burner 7, so that the stacked workpieces at the cutting section are closely pressed against each other, thus allowing clear cutting by the burner 7. It should also be pointed out, in this connection, that the rollers 14 pressing the stacked workpieces 2 are all so adapted as to receive a force from a direction perpendicular to the supporting axes of the rollers 14, so that they can move linearly in only one direction with extremely smooth rolling motion, and also the fact that the roller supporting structure 8 and the gas cutting apparatus supporting structure 3 are interlocked indirectly provides assurance for smooth motion of the gas cutting apparatus without causing ill effects such as vibration and thereby allows always correct and precise cutting.

Also, according to the construction of the present invention, rollers 14 move forward or backward in the lengthwise direction of the base block 1 with movement of burner 7 which is interposed between the two parallel lines of rollers 14, so that each roller 14 will cross the cut grooves formed in the gas cutting operation. But, in this case, roller feelers 16 suspended from the respective roller supporting structures 9, 9 so as to forerun the respective rollers 14 fall first into the cut grooves, whereby an electric relay is instantaneously actuated to transmit a pulse signal to release oil pressure in those hydraulic jacks 13 of rollers 14 that correspond to the particular feelers 16 which fall in the grooves, thus causing the pressing legs 12 to rapidly retract from the top surface of the stack 2, and after the rollers 14 have jumped over the cut grooves, oil pressure is again fed into the hydraulic jacks 13 to cause the rollers to be again pressed against the top surface of the stack of workpieces 2, thereby to prevent vibration of the burner 7 and other elements which may be caused should the rollers 14 fall in the cut grooves.

The operation of separating said rollers 14 from the top surface of the stack, or of again pressing them against the top surface, can be easily determined adjustably from the moving velocity of the roller supporting frames 9, 9 and the distance between roller feelers 16 and rollers 14. Thus, the pressing mechanism of the present invention simply comprises a pair of roller supporting frames 9, 9 of a roller supporting structure 8 riding on guide rails 11, 11, hydraulic jacks 13 suspended from the frames, and rollers 14 attached to said jacks so as to be rollable linearly, so that the mechanism is extremely simple in construction and easy to manufacture and to operate.

While the present invention has been described with particular reference to a preferred form of embodiment, it will be understood that the present invention is not limited to the particular embodiment shown and described above, but various changes and modifications can be made without departing from the spirit of the present invention. For instance, the roller supporting structure 8 may be arranged such that it is movable breadthwise relative to the base block 1, instead of arranging it movable lengthwise as in the shown embodiment. Also, instead of providing independent rollers 14 which are suspended separately from each other from the respective roller supporting frames 9, 9 of the roller supporting structure 8, it is also possible to combine such rollers in one assembly for each roller supporting from 9, that is to say, two cylindrical roller assemblies may be adapted so as to be suspended from the respective roller supporting frames mounted at fixed distances, respectively, from the burner, such that the roller assemblies will provide pressing force over the entire lengthwise or breadthwise length of the stack of workpieces 2 on the base block 1. Such arrangement can produce the same effect and function as in the above-shown embodiment. Rather, in the latter case, there is no need of providing roller hoisting means to prevent rollers 14 from falling in the cut grooves, and also the hydraulic jacks 13 may be provided in limited number on both sides of each roller assembly, so that both construction and operation in the latter case can be even more simplified.

As viewed above, the present invention realizes an excellent pressing device for workpieces to be cut, which device is simple in construction and in operation and which device comprises two roller supporting structures adapted to move either forward or backward (or crosswise) in interlocked relation with motion of, and always keeping fixed intervals from, a burner which is positioned between the roller supporting structures and is secured to a gas cutting apparatus supporting structure arranged to regulated in its amount of motion a plurality of rollers secured through leg means to respective roller supporting structures so as to be suspended therefrom and adapted to roll on the top surface of a stack of workpieces in conformity to linear motion of the roller supporting structures, and oil pressure means for pressing the rollers against the surface of the stack, whereby a plurality of steel plates stacked in many layers can be most effectively pressed tightly against each other to allow smooth gas cutting of the stack of steel plates at one time under numerical control without inviting any impediment for the operation. Thus, the present invention makes it possible to carry out smooth stack-cutting by an automatic gas cutting apparatus at high efficiency and accuracy and also allows a remarkable diminution of number of man hours in ship building and other manufacturing processes, thus greatly contributing to the industries.

What is claimed is:

1. A pressing device, for compressing superposed workpieces, stacked on a stack support, during cutting of the workpieces by cutting apparatus including a burner controllably moved, in a predetermined pattern, over the stacked workpieces, said pressing device comprising, in combination, a burner supporting structure extending across the stack in one direction and movable along the stack in a direction perpendicular to said one direction; a pair of roller supporting structures extending across the stack in said one direction and on opposite sides of said burner; means mounting said roller supporting structures for conjoint movement along the stack in said second direction in interlocked relation with said burner supporting structure and with constantly fixed spacings, in said second direction, from said burner; a plurality of leg means depending from each roller supporting structure and spaced along the respective roller supporting structure at substantially equal spacings from each other; respective rollers on the lower ends of said leg means arranged to engage and roll along the upper surface of the stack; and means operable to press said rollers against the stack to firmly compress the workpieces during cutting of the stacked workpieces.

2. A pressing device, as claimed in claim 1, in which said last named means comprises respective jack means interposed between each leg means and the associated roller supporting structure.

3. A pressing device, as claimed in claim 2, in which said jack means are hydraulic jacks.

4. A pressing device, as claimed in claim 1, in which said mounting means comprises rails extending along opposite sides of said stack in said one direction, and supporting rollers on each roller supporting structure engaged in said rollers; said rails preventing upward movement of said supporting rollers responsive to pressing of said pressing rollers against the top surface of the stack.

5. A pressing device, as claimed in claim 1, including respective feelers associated with said pressing rollers and engaging the top surface of the stack in advance of the associated pressing roller, in the direction of movement of the latter, to detect cuts in the stack; said feelers controlling retraction of the associated rollers from the top surface of the stack in advance of a cut, and reengagement of the associated rollers under pressure with the top surface of the stack after the associated rollers have passed over the cut.

6. A pressing device, as claimed in claim 1, in which said roller supporting structures are interconnected at opposite ends to form a unit.

* * * * *